Sept. 23, 1952  B. E. LUBOSHEZ  2,611,294
SUPPLEMENTAL LENS FOR CAMERA OBJECTIVES
Filed April 27, 1950

BENJAMIN E. LUBOSHEZ
INVENTOR
BY Daniel J. Mayne
Clarence W. Carroll
ATTORNEY & AGENT Patented Sept. 23, 1952

2,611,294

UNITED STATES PATENT OFFICE 2,611,294

SUPPLEMENTAL LENS FOR CAMERA OBJECTIVES

Benjamin E. Luboshez, Rochester, N. Y., assignor to Eastman Kodak Company, Rochester, N. Y., a corporation of New Jersey Application April 27, 1950, Serial No. 158,622

2 Claims. (Cl. 88—57)

This invention relates to photography, and more particularly to camera lenses, commonly termed "supplemental" lenses. These are known to the trade as "portrait attachments" and are intended for use on cameras in a temporary manner. Their function is primarily to produce a satisfactory image of a subject which is too near the camera to be rendered sharp by the objective lens of the camera.

These supplemental lenses are commonly used on cameras equipped with fixed-focus objectives and are available in a ring mount or adapter which may be slipped over or screwed into the outer bezel of the camera lens cell. They are generally of relatively low power, i. e., of a focal length much greater than that of the camera objective lens.

The present invention contemplates the provision of a supplemental lens having special and unique properties.

Many cameras of the hand-held type are fitted with a "flash holder" to accept standard flash bulbs. Most flash bulbs are designed to give optimum subject illumination at a lamp-to-subject distance of from 10 to 16 feet. This is also the recommended lens-to-subject distance when the bulb is used in a flash holder attached to the camera. A lens aperture of from $f/8$ to $f/11$ is generally sufficient to produce a normal exposure on fast panchromatic emulsions, at the above distances.

Inasmuch as subject illumination in flash photography diminishes as the square of the increasing lamp-to-subject distance, and increases as the inverse square when the flash bulb is used nearer to the subject, it is obvious that if the overall illumination from a given bulb is satisfatory at, say, 16 feet, it will be much too intense if used only 4 feet from the same subject. This requires a very much smaller effective aperture to prevent overexposure. In most inexpensive cameras the lens cannot be "stopped down" sufficiently with the diaphragm provided. In simple box cameras it can be stopped down only a fraction of the required amount, and therefore, as these cameras have only one shutter speed, overexposure is bound to occur.

The correction for this combination of conditions in the use of a supplemental lens is, according to this invention, to reduce its light-transmission factor. This is done by making the lens of glass or plastic in which a quantity of dye or pigment is uniformly or selectively distributed, or by adding to the lens a filter layer of the required light-modifying characteristics.

A red, green, or yellow pigment would not be suitable if color pictures are being taken, as it would distort the color-rendering ability of the photographic emulsion. Therefore, a neutral gray is preferable to fulfill the requirements of light reduction without affecting relative color transmission.

Fixed-focus cameras normally work at about $f/12.5$. There are two types of flash lamps and two speeds of film commonly supplied for such cameras. At $f/12.5$ ordinary film with regular flash lamps correctly exposes objects at about 12 feet from the camera. Fast panchromatic films with extra bright (currently called #11) flash lamps correctly expose objects at about 18 feet, but since this film latitude can accommodate the brightness of objects at 12 feet even with these lamps, the latter figure can conveniently be used in determining the proper density for a lens according to the present invention. Thus "correct" illumination is at a subject distance of 12 feet (both lens-to-subject and lamp-to-subject); this may be called distance A. It is within the range of the normal depth of field of a fixed-focus camera, which is about 10 feet to infinity.

The camera is focused at a distance B, about 15 feet, so that for the aperture and focal length involved the far point of the range is about infinity. The distance B is not directly involved in the present invention.

However, when a "portrait attachment" is added, the focus is changed (from B) to a value C which is commonly about 3 to 6 feet. For example, one common attachment gives the camera for which it is intended an effective focus of 3½ feet. The depth of field covers about 3 feet to 4½ feet, the effect of which will be presently considered.

The important feature of the present invention is the relationship between the standard "illumination" distance A and the new "focus" distance C. A density D should be added to the portrait attachment with $$D = \log \left(\frac{A}{C}\right)^2$$

approximately.

The latitude of the film will allow this density to be used even with the subject at the near point (3 feet in the example) or at the far point (4½ feet in the example) of the depth of field and, as pointed out above, it will accommodate faster films or brighter lamps.

The density (D) when A equals 12 feet and C equals 3½ feet, as in the above example, is equal to 1.07. However, useful results are obtained when the value of D is at any point between .6 and 1.2.

It is thus the object of a preferred embodiment of the invention to provide for any one camera one single lens which will have the required light-modifying qualities that will secure the best average exposures with commonly used films and standard flash bulbs.

Examples of supplemental lenses embodying the invention may be visualized by reference to the accompanying drawings, in which.

Figure 1:
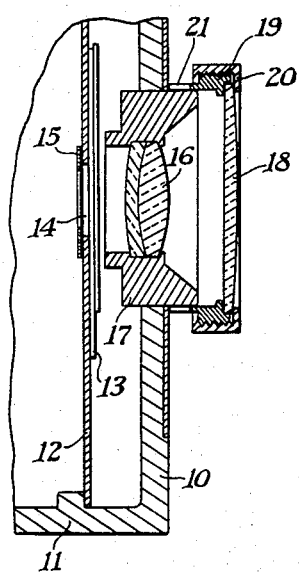
Fig. 1 is a fragmentary vertical section through the front portion of a typical box camera with a supplemental lens in place.

In Fig. 1 the simple box camera shown has a front wall 10, a bottom 11, and a lens plate 12 on which is mounted a shutter, shown conventionally at 13 and covering an exposure aperture 14. A slidable diaphragm or stop member 15 may be mounted on the plate 12. The camera objective is a simple meniscus lens, or it may be a doublet, as indicated at 16, mounted in a cell 17 suitably fixed in the front wall 10.

In Fig. 1 the supplemental lens 18 is held in a mounting ring 19 by a screwed-on bezel 20, and the ring 19 is provided with a springy rim 21 that frictionally retains the whole assembly on the cell 17 in a well known manner.

Figure 2:
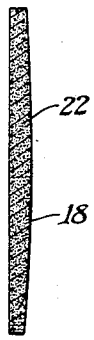
Fig. 2 is an enlarged section of a lens embodying this invention, separated from its mount.
Figure 3:
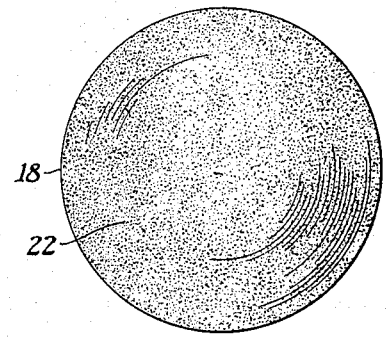
Fig. 3 is a front view of a lens such as that shown in Fig. 2.

As indicated by stippling 22 in Figs. 1, 2, and 3, a suitable gray pigment or dye is uniformly dispersed throughout the material of the lens 18. This may be accomplished by means well known in lens manufacture. The pigment should be of such character that the light-transmitting ability of the lens 18 will be greatly reduced without impairing its other optical characteristics.

Figure 4:
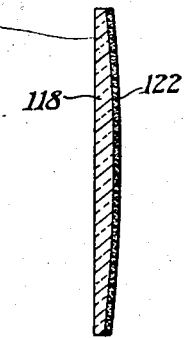
Fig. 4 is an enlarged section of a modified example of the invention.

Fig. 4 shows a modification in which the lens 118 is of clear glass, and a suitable neutral gray light-modifying element 122 is cemented to a surface thereof or is mounted in the same ring as the lens 118. Such a modifying element may be furnished separately to be insertable in such a structure as that of Fig. 1.

Figure 5:
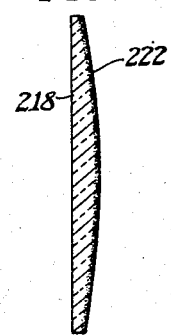
Fig. 5 is a similar section of a further modification.

Fig. 5 shows a lens 218 in which pigment or dye 122 is incorporated within only the outer or front portion of the lens material, although it might alternatively be in the rear or plano face. Means for dyeing glass or acrylic plastics for only a fractional portion of their depth are well known and need not be elaborated here.

I claim:

1. For use with standard flash lamps in close-up flash photography, a supplemental positive lens of relatively long focal length mountable on a fixed-focus, fixed-relative-aperture camera in close axial alignment with the camera lens to change the effective focus of the camera lens to a shorter distance C and having an optical density D equal to $$\text{Log}\left(\frac{A}{C}\right)^2$$

where A is the distance from the camera at which a subject illuminated by a standard flash lamp at the camera correctly exposes film through the relative aperture of said camera lens.

2. For use with standard flash lamps in close-up flash photography, a supplemental positive lens of relatively long focal length mountable on a fixed-focus, fixed-relative-aperture camera in close axial alignment with the camera lens to change the effective focus of the camera lens to shorter distance C and having an optical density D between 0.6 and 1.2 and which is equal to $$\text{Log}\left(\frac{A}{C}\right)^2$$

and where A is the distance from the camera at which a subject illuminated by a standard flash lamp at the camera correctly exposes film through the relative aperture of said camera lens.

BENJAMIN E. LUBOSHEZ.

REFERENCES CITED

The following references are of record in the file of this patent:

UNITED STATES PATENTS

| Number | Name | Date |
|---|---|---|
| 1,169,731 | Mengel | Jan. 25, 1916 |
| 1,446,634 | Bell et al. | Feb. 27, 1923 |
| 1,469,931 | Davidson | Oct. 9, 1923 |
| 1,556,982 | Weidert | Oct. 13, 1925 |
| 1,627,892 | Frederick | May 10, 1927 |
| 1,637,917 | Richter | Aug. 2, 1927 |
| 1,865,691 | Hill | July 5, 1932 |
| 1,966,149 | Stevens | July 10, 1934 |